A. McLEAN & J. H. ROSS.
Improvement in Hand Corn-Shellers.
No. 128,056. Patented June 18, 1872.
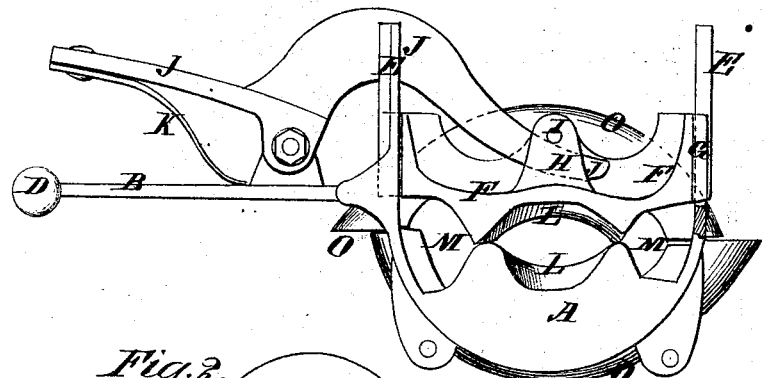
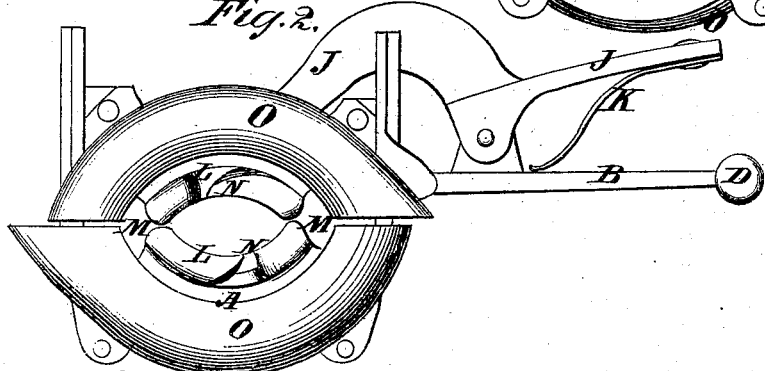
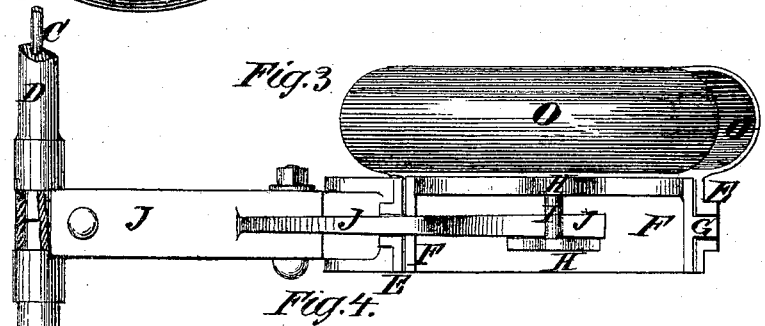
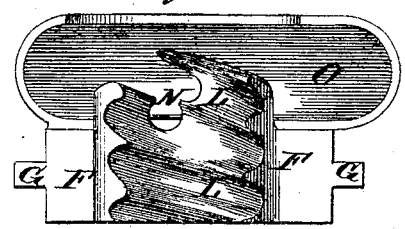
Witnesses:
John Becker
W. A. Graham
Inventor:
Archibald McLean,
James H. Ross.
Per ⎯⎯⎯ Attorneys.

125,056

UNITED STATES PATENT OFFICE.

ARCHIBALD McLEAN AND JAMES H. ROSS, OF CARONDELET, MISSOURI.

IMPROVEMENT IN HAND CORN-SHELLERS.

Specification forming part of Letters Patent No. 128,056, dated June 18, 1872.

Specification describing a new and Improved Hand Corn-Sheller, invented by ARCHIBALD McLEAN and JAMES H. ROSS, of Carondelet, in the county of St. Louis and State of Missouri.

Figure 1 is a side view of our improved hand corn-sheller. Fig. 2 is a side view of the reverse side of the same. Fig. 3 is a top view of the same. Fig. 4 is a detail view of the inner side of the movable part of the same.

Similar letters of reference indicate corresponding parts.

Our invention has for its object to furnish an improved hand corn-sheller, simple in construction, convenient in use, and effective in operation, doing its work quickly and without scattering the kernels; and it consists in the construction and combination of the various parts of the machine, as hereinafter more fully described.

A is the stationary jaw of the sheller, upon one end of which is formed a handle, B, having a hub or socket formed in its outer end to receive the rod C, by which the handles D are secured to said handle B. Upon the ends of the jaw A are formed upwardly-projecting arms, E, the inner faces of which are made smooth, and which are slotted longitudinally, to adapt them to serve as ways to the movable jaw F. The ends of the jaw F are made smooth and straight, to fit against and slide upon the inner sides of the arms E, and have lugs G formed upon them to fit into the slots of the arms E, to serve as guides to the said movable jaw F in its movements. Upon the outer side of the jaw F are formed two lugs, H, connected by a pin, I, which lugs and pin are so arranged as to receive the end of the lever J between the lugs H and beneath the pin I. The lever J is made in about the form shown in Figs. 1 and 2, passes through the slot of the inner arm E, is pivoted at its angle to a lug formed upon the handle B, extends back to or nearly to the handles D, and has a spring, K, attached to the lower side of its outer end, the free end of which rests upon the upper side of the handle B to hold the jaw F down upon the jaw A, or upon the ear of corn between said jaws. The inner or adjacent faces of the jaws A F are concaved, and have spiral threads or flanges L formed in them. In the faces of the jaws A F at the ends of the threads L are formed spaces or channels M to allow the kernels of corn to escape freely. The threads or flanges L project at the forward side of the sheller, and have openings N in them to allow the kernels of corn to escape. O are curved guards concaved upon their inner sides, and attached to the sides of the jaws A F to receive the kernels of corn that may fly off, and prevent said kernels from being scattered and wasted.

In using the sheller, the handle D is grasped with the right hand, the two forefingers of which are used to press down the end of the lever J to open the jaws A F. The ear of corn is inserted with the left hand and held, and the handle D moved forward, the flanges or threads L removing the kernels.

Having thus described our invention, we claim as new and desire to secure by Letters Patent—

The combination of the stationary and movable jaws A F, having spiral flanges or threads L, and spaces or openings M N formed in them, the handles B C D, slotted arms E, lugs G, lugs and pin H I, lever J, spring K, and guards O with each other, substantially as herein shown and described, and for the purpose set forth.

ARCHIBALD McLEAN.
JAMES H. ROSS.

Witnesses:
DANL. McFARLAN,
HENRY G. HERBEL.